US010102303B2

(12) United States Patent
McKenzie et al.

(10) Patent No.: US 10,102,303 B2
(45) Date of Patent: *Oct. 16, 2018

(54) COMPUTING SYSTEM WITH DYNAMIC WEB PAGE FEATURE (71) Applicant: Tribune Media Company, Chicago, IL (US)

(72) Inventors: Ryan Philip McKenzie, Orlando, FL (US); Jerome Schulist, Oviedo, FL (US); Jason Greene, Grand Island, FL (US)

(73) Assignee: Tribune Media Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,503

(22) Filed: Nov. 16, 2016

(65) Prior Publication Data
US 2017/0075914 A1 Mar. 16, 2017

Related U.S. Application Data (63) Continuation of application No. 14/826,633, filed on Aug. 14, 2015, now Pat. No. 9,529,914.
(Continued)

(51) Int. Cl.
G06F 17/30 (2006.01)

(52) U.S. Cl.
CPC ...... *G06F 17/3089* (2013.01); *G06F 17/3087* (2013.01); *G06F 17/30241* (2013.01);
(Continued)

(58) Field of Classification Search
CPC ......... G06F 17/30241; G06F 17/30292; G06F 17/30864; G06F 17/30867; G06F 17/3087
See application file for complete search history.

(56) References Cited

U.S. PATENT DOCUMENTS 7,822,705 B2 * 10/2010 Xia ................... G06F 17/30241
707/603
2007/0168465 A1 7/2007 Toppenberg et al.
(Continued)

OTHER PUBLICATIONS

McKenzie, Ryan P., U.S. Appl. No. 14/826,624, filed Aug. 14, 2015.
(Continued)

*Primary Examiner* — Scott A. Waldron
(74) *Attorney, Agent, or Firm* — McDonnell Boehnen Hulbert & Berghoff LLP (57) ABSTRACT An example method involves accessing web-traffic data associated with a web page hosted by a first computing-device, wherein the web page comprises meta-tag data; using the accessed web-traffic data to determine that the first computing-device received a threshold amount of requests that (i) were for the web page and (ii) originated from a geographical region; responsive to the determining, modifying the meta-tag data based on the geographical region; and transmitting the modified meta-tag data to a second computing-device, wherein the second computing-device is configured for (i) receiving the transmitted modified meta-tag data, (ii) receiving a request for a list of search results based on a set of search terms, (iii) responsive to receiving the request, using the set of search terms and the modified meta-tag data to perform a web search, thereby generating a list of search results, and (iv) transmitting the list of search results to a third computing-device.

20 Claims, 3 Drawing Sheets

Related U.S. Application Data

(60) Provisional application No. 62/065,334, filed on Oct. 17, 2014.

(52) U.S. Cl.
CPC .. *G06F 17/30292* (2013.01); *G06F 17/30864* (2013.01); *G06F 17/30867* (2013.01)

(56) References Cited

U.S. PATENT DOCUMENTS

| | | |
|---|---|---|
| 2008/0040329 A1 | 2/2008 | Cussen et al. |
| 2008/0154887 A1 | 6/2008 | Ryan et al. |
| 2008/0222100 A1 | 9/2008 | Chiu |
| 2009/0138445 A1 | 5/2009 | White et al. |
| 2011/0276626 A1 | 11/2011 | Ball et al. |
| 2011/0093332 A1 | 12/2011 | Gupta et al. |
| 2012/0265756 A1 | 10/2012 | Ryan |
| 2013/0006958 A1 | 1/2013 | Cava |
| 2013/0339333 A1 | 12/2013 | Stekkelpak et al. |

OTHER PUBLICATIONS

International Search Report and Written Opinion dated Jan. 29, 2016, issued in connection with International Patent Application No. PCT/US2015/056223, filed on Oct. 19, 2015.

\* cited by examiner

COMPUTING SYSTEM WITH DYNAMIC WEB PAGE FEATURE

CROSS REFERENCE TO RELATED DISCLOSURE

This disclosure is a continuation of U.S. patent application Ser. No. 14/826,633 filed on Aug. 14, 2015, and issued as U.S. Pat. No. 9,529,914, which claims priority to U.S. Provisional Pat. App. No. 62/065,334 filed Oct. 17, 2014 and entitled "DYNAMIC WEB PAGE", which is hereby incorporated by reference herein in its entirety.

This disclosure relates to U.S. patent application Ser. No. 14/826,624 filed Aug. 14, 2015, issued as U.S. Pat. No. 9,529,913, and entitled "COMPUTING SYSTEM WITH DYNAMIC WEB PAGE FEATURE", which is assigned to the assignee of the present disclosure, and is hereby incorporated by reference herein in its entirety.

USAGE AND TERMINOLOGY

Throughout this disclosure, unless otherwise specified and/or unless the particular context clearly dictates otherwise, each usage of "a" or "an" means at least one, and each usage of "the" means the at least one.

TECHNICAL FIELD

This disclosure relates generally to computing devices, and more particularly, to computing devices configured for dynamically modifying meta-tag data of web pages.

BACKGROUND

Unless otherwise indicated herein, the materials described in this section are not prior art to the claims in this disclosure and are not admitted to be prior art by inclusion in this section.

A web page may represent any type of electronic document, file, or information that is suitable for distribution from a server that hosts the web page, to a web browser running on a client. In order to facilitate this distribution, the server and the web browser may use the hypertext transfer protocol (HTTP). HTTP may be implemented as an application-layer request-response protocol. In one example, the web browser may submit an HTTP request message to the server, and the server may return a response message to the web browser. The response message may include content such as text, images, multimedia, style sheets, scripts, and so on. The web browser may then render the web page for display on an output component of the client.

In connection with publishing a web page, a publisher may include metadata in the web page. A commonly used type of metadata is meta-tag data, which may specify one or more keywords that describe or otherwise relate to the web page's content. A web-based search engine may consider a web page's meta-tag data when indexing the web or performing a web search to assist in guiding a web user to relevant web content. As such, by carefully determining meta-tag data for a web page, a publisher may increase the likelihood that the web page will be included in a list of search results, and that the web page will have a high priority-ranking within the list of search results (both, where logically appropriate).

SUMMARY

In one aspect, an example method involves accessing web-traffic data associated with a web page hosted by a first computing-device, wherein the web page includes meta-tag data; using the accessed web-traffic data to determine that the first computing-device received a threshold amount of requests that (i) were for the web page and (ii) originated from a particular geographical region; and responsive to determining that the first computing-device received the threshold amount of requests that (i) were for the web page and (ii) originated from the particular geographical region, modifying the meta-tag data based on the particular geographical region.

In another aspect, a non-transitory computer-readable medium has stored thereon program instructions that when executed by a processor cause performance of a set of acts. The set of acts includes accessing web-traffic data associated with a web page hosted by a first computing-device, wherein the web page includes meta-tag data; using the accessed web-traffic data to determine that the first computing-device received a threshold amount of requests that (i) were for the web page and (ii) originated from a particular geographical region; and responsive to determining that the first computing-device received the threshold amount of requests that (i) were for the web page and (ii) originated from the particular geographical region, modifying the meta-tag data based on the particular geographical region.

These, as well as other aspects, advantages, and alternatives, will become apparent to those of ordinary skill in the art by reading the following detailed description, with reference where appropriate to the accompanying drawings.

DETAILED DESCRIPTION

I. Overview

As indicated above, in connection with publishing a web page, a publisher (or another individual) may determine meta-tag data and include such meta-tag data in the web-page. However, in some instances, such meta-tag data may not accurately represent the search terms that web users are likely to use in searching for the content of the web page. This may occur for a variety of reasons.

For example, this may occur because the publisher may characterize the content of the web page differently from how a web user seeking the content may characterize it. In addition, even if the publisher does determine "appropriate" meta-tag data for the web page, a web user's characterization of such content may change over time. Since the publisher typically determines meta-tag data of a web page when the web page is being published, the originally determined meta-tag data may become outdated after the web page is published.

This issue may be particularly common in connection with web pages that include news-related content. To illustrate this, consider the August 2005 event of hurricane Katrina, which formed near the southeastern region of the Bahamas, and then passed through New Orleans, La. When the hurricane was near the Bahamas, a publisher may have published a web page with content related to this event and with meta-tag data specifying the keywords HURRICANE, BAHAMAS, and AUGUST, for instance. Later as the hurricane passed through Louisiana however, unless the publisher manually updated the meta-tag data of the web page, the meta-tag data would not specify LOUISIANA as a keyword. As a result, a web user conducting a web search based on the search terms HURRICANE and LOUISIANA, may have received a list of search results that did not include an indication of the web page (or perhaps that did include an indication of the web page, but with a low-priority ranking assigned to it), despite the web page being one that the web user would likely be interested in.

To help address this issue, according to the present disclosure, a computing device may use data generated by a data-logging system to dynamically modify meta-tag data of a web page. A data-logging system may generate a variety of different types of data. As one example, a data-logging service may generate web-traffic data associated with a web page. Such web-traffic data may include data that indicates a web user's request for the web page and further may include source-location data that indicates a particular geographic region from which the request originated. Such source-location data may take a variety of forms, including for example, an Internet Protocol (IP) address of a device from which the request originated, or perhaps global position system (GPS) coordinates of such a device. The data-logging system may transmit such web-traffic data to one or more computing devices or may store such data in a data storage for later retrieval (e.g., to generate reports based on the data).

By using web-traffic data to modify meta-tag data of a web page, the meta-tag data may more accurately represent the search terms that web users are likely to use in searching for the content of the web page. Indeed, if a significant number of requests for a web page relating to a hurricane originate from Louisiana, it may be a reasonable conclusion that the web page is particularly relevant to people in Louisiana, and thus it may be desirable for the web page to include meta-data that specifies the keyword LOUISIANA. With such meta-data, the web page may become more easily discoverable by another web user who is interested in such content.

According to the present disclosure, in one example a method involves a first computing-device accessing web-traffic data associated with a web page hosted by a second computing-device, where the web page includes meta-tag data. The method further involves the first computing-device using the accessed web-traffic data to determine that the second computing-device received a threshold amount of requests that (i) were for the web page and (ii) originated from a particular geographical region, and in response, the first-computing device may modify the meta-tag data based on the particular geographical region.

In one example, if an identifier of the particular geographical region does not already exist as a keyword specified by the meta-tag data, the identifier may be added as a keyword specified by the meta-tag data. As such, modifying the meta-tag data may involve adding, to a set of meta-tag keywords of the web page, a meta-tag keyword that identifies the particular geographical region. As another example, if the identifier is already a keyword specified by the meta-tag data, a level of priority (sometimes referred to as a score, weight, or relevancy factor) of the identifier search term may be increased. As such, in another example, modifying the meta-tag data may involve increasing a priority level assigned to a meta-tag keyword within a group of meta-tag keywords of the web page, where the meta-tag keyword specifies an identifier of the particular geographical region. Such an indication of priority may be included as part of the meta-tag data.

As indicated above, by using web-traffic data to modify meta-tag data of a web page, the meta-tag data may more accurately represent the search terms that web users are likely to use in searching for the content of the web page.

II. Example System

Figure 1:
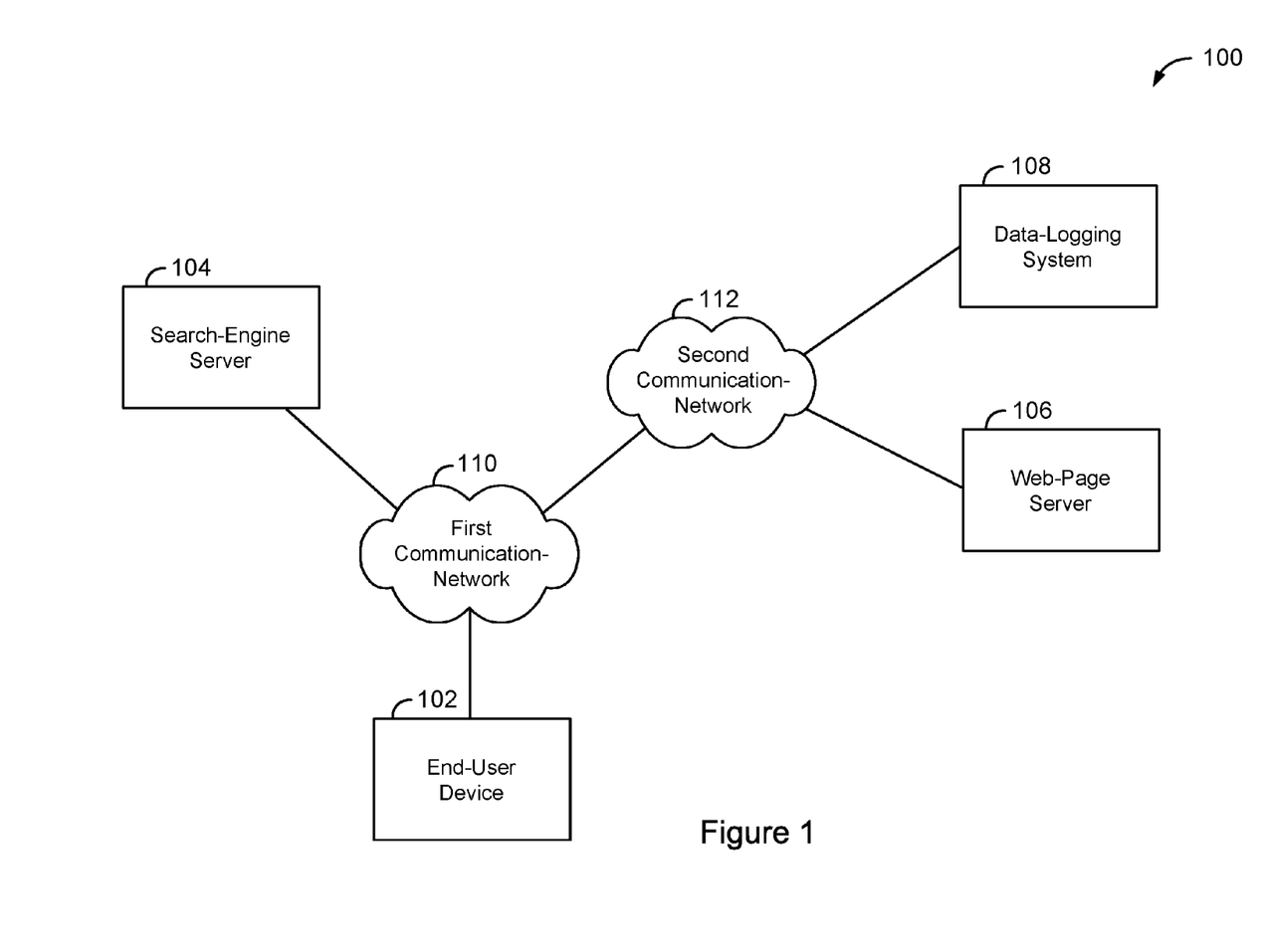
FIG. 1 is a simplified block diagram of an example system.

FIG. 1 is a simplified block diagram of an example system 100 in which aspects of the present disclosure can be implemented. As shown, the system 100 includes four computing devices, namely an end-user device 102, a search-engine server 104, a web-page server 106, and a data-logging system 108. Further, the system 100 includes a first communication-network 110 and a second communication-network 112.

Figure 2:
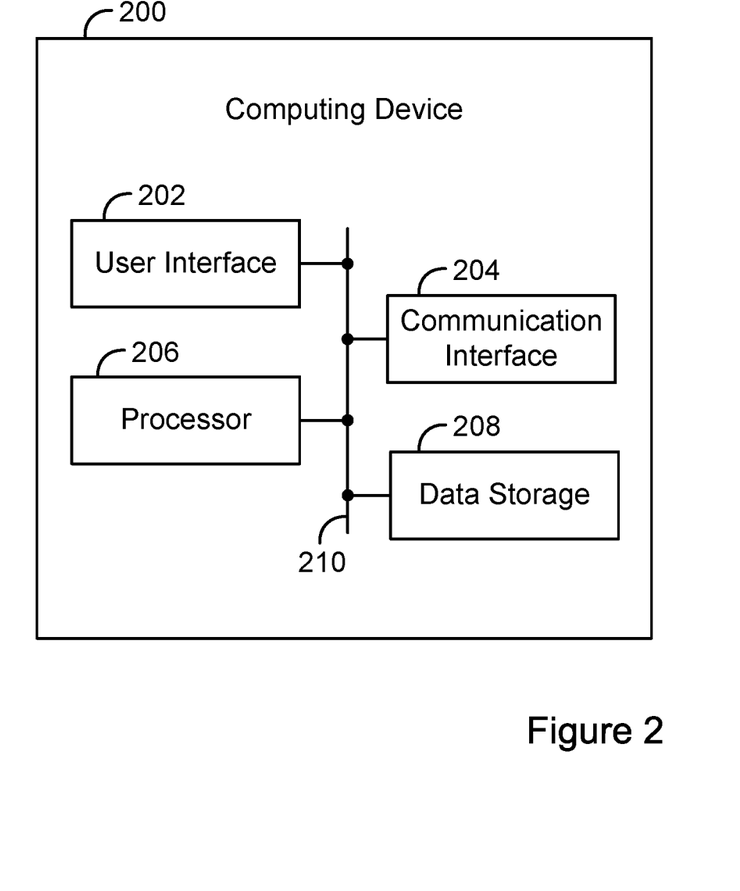
FIG. 2 is a simplified block diagram of an example computing device.

FIG. 2 is a simplified block diagram of an example computing-device 200. The computing device 200 may take a variety of forms, including for example, a workstation, laptop, tablet, or mobile phone, among other possibilities. The computing device 200 may include various components, including for example, a user interface 202, a communication interface 204, a processor 206, and a data storage 208, all of which may be communicatively linked to each other via a system bus, network, or other connection mechanism 210.

The user interface 202 may be configured for facilitating interaction between the computing device 200 and a user of the computing device 200, such as by receiving input from the user and providing output to the user. Thus, the user interface 202 may include input components such as a computer mouse, a keyboard, a touch-sensitive panel, or perhaps a microphone for receiving voice commands. In addition, the user interface 202 may include output components such as a display screen (which, for example, may be combined with a touch-sensitive panel) a sound speaker or other audio output mechanism, and a haptic feedback system.

The communication interface 204 may be configured to allow the computing device 200 to communicate with one or more devices according to any number of protocols. The communication interface 204 may take a variety of forms. As one example, the communication interface 204 may take the form of a wired interface, such as an Ethernet interface. As another example, the communication interface 204 may take the form of a wireless interface, such as a cellular or WI-FI interface.

The processor 206 may include a general purpose processor (e.g., a microprocessor) and/or a special purpose processor (e.g., a digital signal processors (DSP)).

The data storage 208 may include one or more volatile, non-volatile, removable, and/or non-removable storage components, such as magnetic, optical, or flash storage, and may be integrated in whole or in part with the processor 206. Further, the data storage 208 may take the form of a non-transitory computer-readable storage medium, having stored thereon program instructions (e.g., compiled or non-compiled program logic and/or machine code) that, when executed by the processor 206, cause the computing device 200 to perform one or more acts, such as those described in this disclosure. The data storage 208 may also be used to store various types of data, such as those types described in this disclosure (e.g., mapping data), for processing and/or later retrieval.

Generally, the system 100 may be configured such that each of the computing devices in the system 100 may communicate with one or more of the other computing device via the first communication-network 110 and/or the second communication-network 112. The communication networks 110, 112 may take a variety of forms. For example, the first communication-network may take the form of a packet-switched network such as the Internet. And the second communication-network may take the form of a local-area network (LAN).

III. Example Operations

To conduct a web search, a user may cause the end-user device 102 to request from the search-engine server 104 a list of search results based on a set of search terms. Responsive to receiving the request, the search-engine server 104 may use the set of search terms to perform a web search, thereby generating a list of search results, which the search-engine server 104 may provide to the end-user device 102 for display on an output component of the end-user device 102.

As discussed above, the search-engine server 104 may consider a web page's meta-tag data in connection with performing a web search. For example, where a web page A hosted by the web-page server 106 has meta-tag data that specifies the keywords HURRICANE, BAHAMAS, and AUGUST, and where a user conducts a web search based on the search terms HURRICANE and AUGUST, the search-engine server 104 may identify the appropriate matches, and as a result include an indication of the web page A in the list of search results. The search-engine server 104 may assign a level of priority to the web page A based on a variety of factors, including for instance, the degree of similarity between meta-tag keywords and the search terms and/or any weighting factors associated with any of the particular meta-tag keywords. The search-engine server 104 may use the assigned priorities to order the indicated web pages within the list of search results. In one example, to obtain the meta-tag data of the web page A, the search-engine server 104 may transmit a request to the web-page server 106, and in response, the web-page server may transmit the meta-tag data, and/or other data relating to the web page A, to the search-engine server 104.

After the end-user device 102 receives and displays the list of search results, a user may cause the end-user device 102 to select the web page A from the list of search results, which in turn may cause the end-user device 102 to request from the web-page server 106, the web page A. In response, the web-page server 106 may provide the web page A to the end-user device 102, which may receive and display the web page A for the user.

The data-logging system 108 may monitor and log data, and may generate reports related to such data. In one example, the data-logging system 108 may generate web-traffic data associated with a web page. Such web-traffic data may include, for example, data relating to one or more requests for the web page, including for instance, a date and time of the request or source-location data that indicates (or could be used to determine) a particular geographic region from which a given request originated. As indicated above, such source-location data may take a variety of forms, including for example, an IP address of a device from which the request originated. As another example, the source-location data may be GPS coordinates of a device from which the request originated. As yet another example, the source-location data may be data provided by a browser that supports location-aware browsing. Other examples are possible as well.

In one example, the data-logging system 108 may log data and generate reports based on data that traverses the second communication-network 112. This data may be web-traffic data associated with the web page A, for instance. The data-logging system 108 and/or another system may use various techniques to monitor, log, and generate data as known in the art. As one example, the web-page server 106 may log web-page requests that it receives from the end-user device 102, and then may forward such requests to the data-logging system 108. In addition, in response to receiving such requests, the web-page server 106 may transmit a "web bug" to the end-user device 102, which may cause the end-user device 102 to transmit data regarding its activity to the data-logging system 108. In some instances, it may be beneficial to apply techniques that reduce the time between the occurrence of an event and the time that the data-logging system reports such an event. In the present disclosure, this may have the effect of the meta-tag data of a web page being dynamically updated based on web-user activity in real-time or near real-time.

Figure 3:
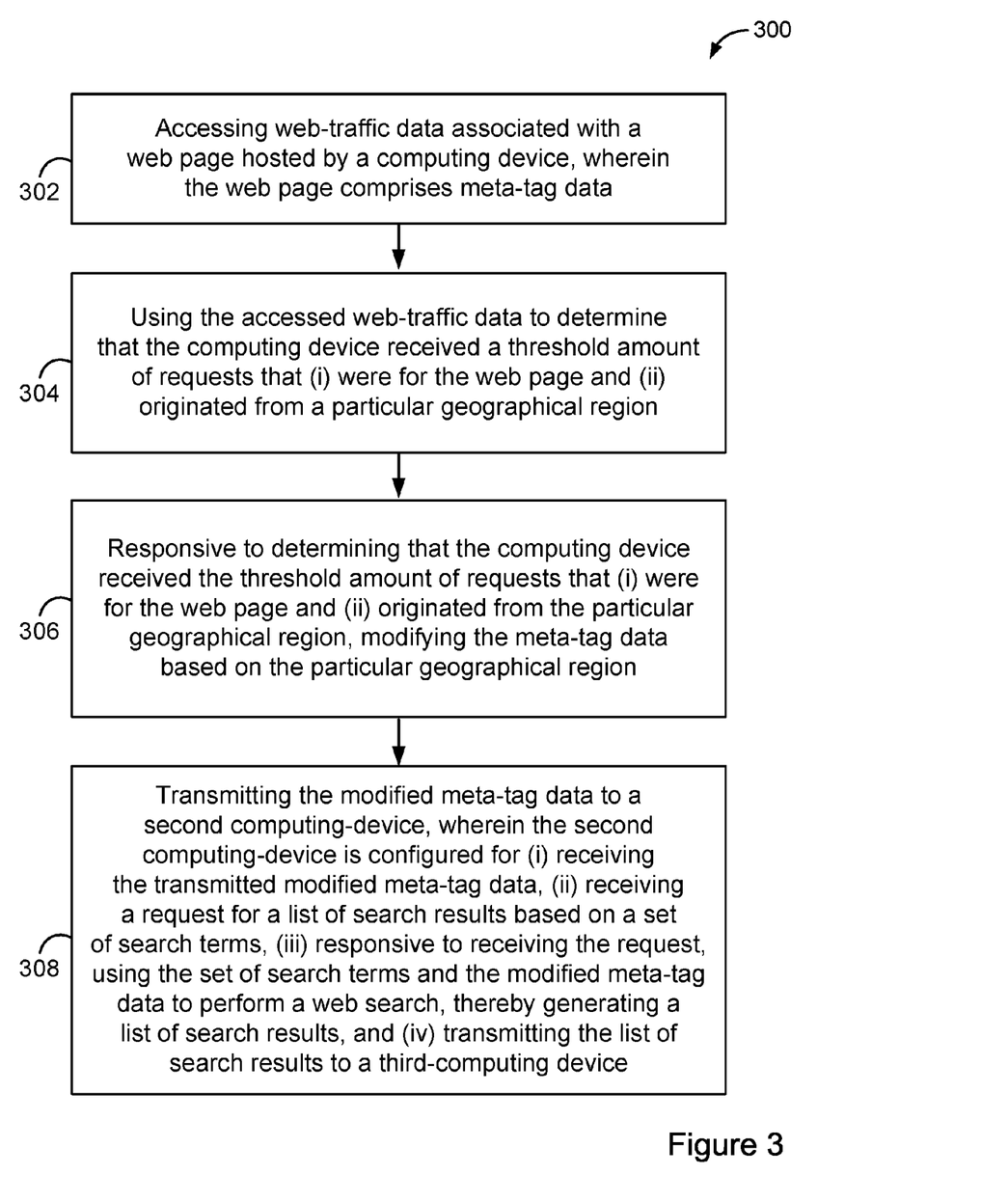
FIG. 3 is a flow chart depicting acts of an example method.

As discussed above, a computing device may use data generated by a data-logging system to dynamically modify meta-tag data of a web page. FIG. 3 is a flow chart depicting acts that can be carried out in an example method to provide such a feature.

At block 302, the example method involves accessing web-traffic data associated with a web page hosted by a computing device, wherein the web page includes meta-tag data. For example, this may involve the web-page server 106 accessing web-traffic data associated with the web page A hosted by the web-page server 106.

At block 304, the method involves using the accessed web traffic data to determine that the computing device received a threshold amount of requests that (i) were for the web page and (ii) originated from a particular geographical region. For example, this may involve the web-page server 106 using the accessed web-traffic data to determine that the web-page server 106 received a threshold amount of requests that (i) were for the web page A and (ii) originated from the geographical region of Louisiana. Such requests may have originated from the end-user device 102 or from other end-user devices.

In one implementation, the threshold amount of requests that (i) were for the web page and (ii) originated from the particular geographical region involve a threshold number of requests that (i) were for the web page, (ii) originated from the particular geographical region, and (iii) were received by the computing device within a particular time period. The threshold amount, threshold number, and/or the particular time period may be determined by a publisher or another individual or may be determined based on one or more rules.

In some instances, the particular time period may be inversely proportional to the number of users for which activity is being monitored by the data-logging system in connection with a given web page. As such, where requests are being monitored for a relatively large number of users, the particular time period may be zero to three hours. Alternatively, where requests are being monitored for a relatively small number of users (and perhaps even for a single user), the particular time period may be zero to three months. In another example, one or more thresholds may be defined so as to identify a top n number of keywords requested during a particular time period.

At block 306, the method involves responsive to determining that the computing device received the threshold amount of requests that (i) were for the web page and (ii) originated from the particular geographical region, modifying the meta-tag data based on the particular geographical region. For example, this may involve responsive to the web-page server 106 determining that the web page-server received the threshold amount of requests that (i) were for the web page A (ii) originated from the particular geographical region of Louisiana, modifying the meta-tag data based on the particular geographical region of Louisiana.

In one example, if an identifier of the particular geographical region does not already exist as a keyword specified by the meta-tag data, the identifier may be added as a keyword specified by the meta-tag data. As such, modifying the meta-tag data may involve adding, to a set of meta-tag keywords of the web page, a meta-tag keyword that identifies the particular geographical region. For example, this may involve the web-page server 106 adding to a set of meta-tag keywords of the web page A, a meta-tag keyword that specifies LOUISIANA.

In some implementations, the act of using the accessed web-traffic data to determine that the computing device received a threshold amount of requests that originated from a particular geographical region may involve using the web-traffic data to determine that the computing device received a threshold amount of requests that were associated with source-location data that satisfies a condition. For example, this may involve the web-page server 106 determining that the web-page server 106 received a threshold amount of requests including or otherwise associated with an IP address that falls within a particular range of IP addresses (associated with a particular geographical region). As another example, this may involve the web-page server 106 determining that the web-page server 106 received a threshold amount of requests including or otherwise associated with a GPS coordinates that falls within a particular range of GPS coordinates (associated with a particular geographical region).

In some instances, mapping data may be used to map a condition to a geographical region. Accordingly, the method may involve mapping the condition to a term that identifies the particular geographical region, where modifying the meta-tag data based on the particular geographical region involves adding, to a set of meta-tag keywords of the web page, the mapped term as a meta-tag keyword.

As another example, if the identifier of the particular geographical region is already a keyword specified by the meta-tag data, a level of priority of the identifier may be increased. As such, in another example, modifying the meta-tag data may involve increasing a priority level assigned to a meta-tag keyword within a group of meta-tag keywords of the web page, where the meta-tag keyword identifies the particular geographical region. For example, this may involve the web-page server 106 increasing a priority level assigned to a meta-tag keyword within a group of meta-tag keywords of the web page A, where the meta-tag keyword specifies LOUISIANA. The assigned priority level may be stored in a data storage of the web-page server 106 as part of the meta-tag data, for instance.

As noted above, in some instances, mapping data may be used to map a condition to a geographical region. Accordingly, the method may involve mapping the condition to a term that identifies the particular geographical region, where modifying the meta-tag data based on the particular geographical region involves increasing a priority level assigned to a meta-tag keyword within a group of meta-tag keywords of the web page, and where the meta-tag keyword specifies the mapped term.

As a result of modifying the meta-tag data in one or more of these ways, the meta-tag keywords—and potentially the order of priority of the meta-tag keywords—for a given web page may more accurately reflect web users' current characterization of the web page's content. As such, continuing with the example provided above, if a web user later conducts a web search based on the search terms HURRICANE and LOUISIANA, the web user may receive a list of search results that includes, with a high level of priority, an indication of the web page A.

At block 308, the method involves transmitting the modified meta-tag data to a second computing-device, wherein the second computing-device is configured for (i) receiving the transmitted modified meta-tag data, (ii) receiving a request for a list of search results based on a set of search terms, (iii) responsive to receiving the request, using the set of search terms and the modified meta-tag data to perform a web search, thereby generating a list of search results, and (iv) transmitting the list of search results to a third computing-device.

In one example, this may involve the web-page server 106 transmitting the modified meta-tag data of web page A to the search-engine server 104. Further, the search-engine server 104 may receive the modified meta-tag data of web page A, and may receive a request for a list of search results based on a set of search terms that includes the term KATRINA. Responsive to receiving the request, the search-engine server 104 may use the term KATRINA and the modified meta-tag data of web page A to perform a web search, thereby generating a list of search results, which includes a reference to web page A. The search-engine server 104 may then transmit the list of search results to the end-user device 102, which in turn, may receive and output the list of search results.

It should be noted that any combination of the preceding operations or techniques may be combined in order to achieve a desired result of modified meta-tag data. Further, the web-traffic data may have been collected over an extended period of time, so that modifying the meta-tag data may reflect a search trend over that extended period of time.

IV. Example Variations

The variations described in connection with select examples of the disclosed system and method may be applied to all other examples of the disclosed system and method.

Further, while one or more acts have been described as being performed by or otherwise related to certain devices or entities (e.g., the web-page server 106), the acts may be performed by or otherwise related to any device or entity (e.g., the data-logging system 108).

In addition, it should be understood that numerous variations of the disclosed system and method are possible. For instance, structural elements and process steps can be rearranged, combined, distributed, eliminated, or otherwise changed, while remaining within the scope of the embodiments as claimed.

Further, the acts need not be performed in the disclosed order, although in some examples, an order may be preferred. Also, not all acts need to be performed to achieve the desired advantages of the disclosed system and method, and therefore not all acts are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

We claim:

1. A method comprising:
   accessing web-traffic data associated with a web page hosted by a first computing-device, wherein the web page comprises meta-tag data;
   using the accessed web-traffic data to determine that the first computing-device received a threshold amount of requests that (i) were for the web page and (ii) originated from a particular geographical region;
   responsive to determining that the first computing-device received the threshold amount of requests that (i) were for the web page and (ii) originated from the particular geographical region, modifying the meta-tag data based on the particular geographical region;
   receiving a request for a list of search results based on a set of search terms;
   responsive to receiving the request, using the set of search terms and the modified meta-tag data to perform a web search, thereby generating a list of search results; and
   transmitting the list of search results to a second computing-device.

2. The method of claim 1, wherein the threshold amount of requests that (i) were for the web page and (ii) originated from the particular geographical region comprises a threshold number of requests that (i) were for the web page, (ii) originated from the particular geographical region, and (iii) were received by the first computing-device within a particular time period.

3. The method of claim 1, wherein modifying the meta-tag data based on the particular geographical region comprises adding, to a set of meta-tag keywords of the web page, a meta-tag keyword that identifies the particular geographical region.

4. The method of claim 1, wherein modifying the meta-tag data based on the particular geographical region comprises increasing a priority level assigned to a meta-tag keyword within a group of meta-tag keywords of the web page, wherein the meta-tag keyword identifies the particular geographical region.

5. The method of claim 1, wherein using the accessed web-traffic data to determine that the first computing-device received a threshold amount of requests that (i) were for the web page and (ii) originated from a particular geographical region comprises using the web-traffic data to determine that the first computing-device received a threshold amount of requests that (i) were for the web page and (ii) were associated with source-location data that satisfies a condition.

6. The method of claim 5, further comprising:
   mapping the condition to a term that identifies the particular geographical region, wherein modifying the meta-tag data based on the particular geographical region comprises adding, to a set of meta-tag keywords of the web page, the mapped term as a meta-tag keyword.

7. The method of claim 5, further comprising:
   mapping the condition to a term that identifies the particular geographical region, wherein modifying the meta-tag data based on the particular geographical region comprises increasing a priority level assigned to a meta-tag keyword within a group of meta-tag keywords of the web page, wherein the meta-tag keyword specifies the mapped term.

8. The method of claim 1, wherein using the accessed web-traffic data to determine that the first computing-device received a threshold amount of requests that (i) were for the web page and (ii) originated from a particular geographical region comprises using the web-traffic data to determine that the first computing-device received a threshold amount of requests that (i) were for the web page and (ii) were associated with an IP address that satisfies a condition.

9. The method of claim 8, further comprising:
   mapping the condition to a term that identifies the particular geographical region, wherein modifying the meta-tag data based on the particular geographical region comprises adding, to a set of meta-tag keywords of the web page, the mapped term as a meta-tag keyword.

10. The method of claim 8, further comprising:
    mapping the condition to a term that identifies the particular geographical region, wherein modifying the meta-tag data based on the particular geographical region comprises increasing a priority level assigned to a meta-tag keyword within a group of meta-tag keywords of the web page, wherein the meta-tag keyword specifies the mapped term.

11. A non-transitory computer-readable medium having instructions stored thereon that, when executed by a processor, cause performance of a set of acts comprising:
    accessing web-traffic data associated with a web page hosted by a first computing-device, wherein the web page comprises meta-tag data;
    using the accessed web-traffic data to determine that the first computing-device received a threshold amount of requests that (i) were for the web page and (ii) originated from a particular geographical region;
    responsive to determining that the first computing-device received the threshold amount of requests that (i) were for the web page and (ii) originated from the particular geographical region, modifying the meta-tag data based on the particular geographical region;
    receiving a request for a list of search results based on a set of search terms;
    responsive to receiving the request, using the set of search terms and the modified meta-tag data to perform a web search, thereby generating a list of search results; and
    transmitting the list of search results to a second computing-device.

12. The non-transitory computer-readable medium of claim 11, wherein the threshold amount of requests that (i) were for the web page and (ii) originated from the particular geographical region comprises a threshold number of requests that (i) were for the web page, (ii) originated from the particular geographical region, and (iii) were received by the first computing-device within a particular time period.

13. The non-transitory computer-readable medium of claim 11, wherein modifying the meta-tag data based on the particular geographical region comprises adding, to a set of meta-tag keywords of the web page, a meta-tag keyword that identifies the particular geographical region.

14. The non-transitory computer-readable medium of claim 11, wherein modifying the meta-tag data based on the particular geographical region comprises increasing a priority level assigned to a meta-tag keyword within a group of meta-tag keywords of the web page, wherein the meta-tag keyword identifies the particular geographical region.

15. The non-transitory computer-readable medium of claim 11, wherein using the accessed web-traffic data to determine that the first computing-device received a threshold amount of requests that (i) were for the web page and (ii) originated from a particular geographical region comprises using the web-traffic data to determine that the first computing-device received a threshold amount of requests that (i) were for the web page and (ii) were associated with source-location data that satisfies a condition.

16. The non-transitory computer-readable medium of claim 15, the set of acts further comprising:
mapping the condition to a term that identifies the particular geographical region, wherein modifying the meta-tag data based on the particular geographical region comprises adding, to a set of meta-tag keywords of the web page, the mapped term as a meta-tag keyword.

17. The non-transitory computer-readable medium of claim 15, the set of acts further comprising:
mapping the condition to a term that identifies the particular geographical region, wherein modifying the meta-tag data based on the particular geographical region comprises increasing a priority level assigned to a meta-tag keyword within a group of meta-tag keywords of the web page, wherein the meta-tag keyword specifies the mapped term.

18. The non-transitory computer-readable medium of claim 11, wherein the using the accessed web-traffic data to determine that the first computing-device received a threshold amount of requests that (i) were for the web page and (ii) originated from a particular geographical region comprises using the web-traffic data to determine that the first computing-device received a threshold amount of requests that (i) were for the web page and (ii) were associated with an IP address that satisfies a condition.

19. The non-transitory computer-readable medium of claim 18, the set of acts further comprising:
mapping the condition to a term that identifies the particular geographical region, wherein modifying the meta-tag data based on the particular geographical region comprises adding, to a set of meta-tag keywords of the web page, the mapped term as a meta-tag keyword.

20. A system comprising:
a first computing-device; and
a controller having one or more processors and memory storing instructions that, when executed by the one or more processors, cause the system to carry out operations including:
accessing web-traffic data associated with a web page hosted by the first computing-device, wherein the web page comprises meta-tag data;
using the accessed web-traffic data to determine that the first computing-device received a threshold amount of requests that (i) were for the web page and (ii) originated from a particular geographical region;
responsive to determining that the first computing-device received the threshold amount of requests that (i) were for the web page and (ii) originated from the particular geographical region, modifying the meta-tag data based on the particular geographical region;
receiving a request for a list of search results based on a set of search terms;
responsive to receiving the request, using the set of search terms and the modified meta-tag data to perform a web search, thereby generating a list of search results; and
transmitting the list of search results to a second computing-device.

* * * * *